United States Patent [19]

Lukkarinen et al.

[11] Patent Number: 5,260,857
[45] Date of Patent: Nov. 9, 1993

[54] ADJUSTMENT LINKAGE FOR A VEHICLE HEADLAMP

[75] Inventors: Mark A. Lukkarinen, Merrimack; Charles M. Coushaine, Rindge, both of N.H.

[73] Assignee: GTE Products Corporation, Danvers, Mass.

[21] Appl. No.: 889,690

[22] Filed: May 27, 1992

[51] Int. Cl.⁵ .................................... F21M 3/20
[52] U.S. Cl. ........................... 362/66; 362/80; 362/428
[58] Field of Search .......... 362/61, 66, 80, 267, 362/418, 419, 421, 427, 428, 287, 289

[56] References Cited

U.S. PATENT DOCUMENTS

| | | | |
|---|---|---|---|
| 4,503,486 | 3/1985 | Makita | 362/61 |
| 4,574,334 | 3/1986 | Igura | 362/66 |
| 4,881,152 | 11/1989 | Watanabe et al. | 362/66 |
| 4,903,173 | 2/1990 | Mochizuki et al. | 362/66 |
| 5,032,964 | 7/1981 | Endo et al. | 362/66 |

Primary Examiner—Richard R. Cole
Attorney, Agent, or Firm—William E. Meyer

[57] ABSTRACT

An adjustment linkage for vehicle headlamp having housing coupler, adjustment shaft, shaft seal, and threaded coupler for coupling to a pivotable reflector is disclosed. The adjustment linkage is designed to be operated by a Philipshead screwdriver used as a gearing. No permanent gear box is formed in the linkage. A minimal linkage is formed that is accessible from the top of the headlamp module by the length of the screw driver. The adjustment linkage is water sealed to accommodate rotation and pivoting of the linkage.

8 Claims, 2 Drawing Sheets

ADJUSTMENT LINKAGE FOR A VEHICLE HEADLAMP

1. TECHNICAL FIELD

The invention relates to headlamps and particularly to an adjustment assembly for headlamps. More particularly the invention is concerned with a hand operated drive adjustment for vehicle headlamps.

2. BACKGROUND ART

To properly direct the forward beam, headlamps need to be adjusted. With headlamps, and the available space under the vehicle hood becoming smaller, the adjustment mechanism needs to become both more accurate and less bulky, and the associated access space needs to be minimized. Existing headlamp adjustments include a variety of shaft and gear linkages. By turning an end of the linkage, a threading advances or retracts a reference point of the headlamp module. The headlamp module then pivots, thereby redirecting the forward beam. An advantage to the shaft and gear type linkage is that direct access to the back of the headlamp is no longer necessary. The rear facing linkage can be brought up ninety degrees, so the linkage ends near the top rear of the headlamp. The adjustment can then be made from the top of the headlamp. Nonetheless, vehicle manufacturers would prefer to eliminate the shaft and gear linkages, as they still take up space. There is then a need for an adjustment linkage for vehicle headlamp that minimizes the associated access volume.

There are a number of other problems with the shaft and gear type linkage. Primarily, there are too many components, which means the materials, and assembly costs are high, and there are more elements that may be defective, or fail. There is then a need to reduce the number of elements in the adjustment linkage. Hands, tools or parts tend to rest on or hit the top end of the linkage. The hand, tool, part or linkage may then be damaged. There is then a need to remove the top exposed linkage.

Commonly, a headlamp module is mounted on a backplate that is bolted to the vehicle. The headlamp then pivots with respect to the backplate. The headlamp as a whole moves with respect to the vehicle, hereby upsetting water seals, and tight finish lines around the headlamp. To avoid these results, headlamps are now being made with a housing enclosing an adjustable internal reflector. The housing is bolted to the vehicle, while the reflector inside may be aimed independently of the housing. The adjustment linkage must then pass from the exterior through the housing to couple with the internal reflector. The same adjustment linkage problems as described before must still be overcome, but also, to lessen or prevent the likelihood of the housing interior from fogging up, a water seal must now be included in the length of the adjustment linkage. There is then a need for a simple, compact, water sealed adjustment linkage for use in vehicle headlamps.

Examples of the art shown in U.S. patents include:

U.S. Pat. No. 4,574,334 issued to Kenkichi Igura on Mar. 4, 1986 for a Device for Adjusting the Inclination of the Light Axis of Headlamps of a Motor Vehicle shows a pivoted headlamp assemble, with a threaded shaft driver. A hand knob is shown coupled to a gearing that threads the adjustment shaft in and out.

U.S. Pat. No. 4,674,018 issued to Francis E. Ryder et al on Jun. 16, 1987 for a Head Lamp Adjusting Mechanism shows a pivoted headlamp adjusted by a driven threaded shaft. A Right angle coupling is shown with a gear box coupling between two permanent shafts is shown.

U.S. Pat. No. 4,731,707 issued to David R. McMahan on Mar. 15, 1988 for a Vehicle Headlamp Assembly shows a pivoted headlamp adjusted by a driven threaded shaft. The drive mechanism includes two permanent shafts coupled at right angles by a gearbox type coupling.

U.S. Pat. No. 5,068,769 issued to Toru Umeda et al on Nov. 26, 1991 for a Horizontal Sighting Adjustment linkage for Head-Lamps shows a pivoted headlamp adjusted by a driven threaded shaft. The drive mechanism includes a thumb wheel that turns a gear coupled to the adjustment shaft.

U.S. Pat. No. 5,070,433 issued to Ulrich Zillgitt et al on Dec. 3, 1991 for a Headlight for a Motor Vehicle having an Adjustable Motor-Driven Reflector shows a geared motor drive for automatically adjusting the headlamp aiming.

DISCLOSURE OF THE INVENTION

An adjustment linkage for vehicle headlamp may be formed with a housing coupler forming a portion of a reflector housing which includes a means for supporting a rotatable shaft, an adjustment shaft supported by the housing coupler having exterior means for rotating the shaft and a threaded internal end, a threaded coupler for coupling to a pivotable reflector enclosed in the reflector housing and threaded to the threaded end of the adjustment shaft, and an elastic grommet encircling and coupled to the shaft, and encirclingly coupled to the coupler housing around the interior shaft passage end of the shaft passage to form a seal between the housing coupler and the shaft.

BEST MODE FOR CARRYING OUT THE INVENTION

Figure 1:
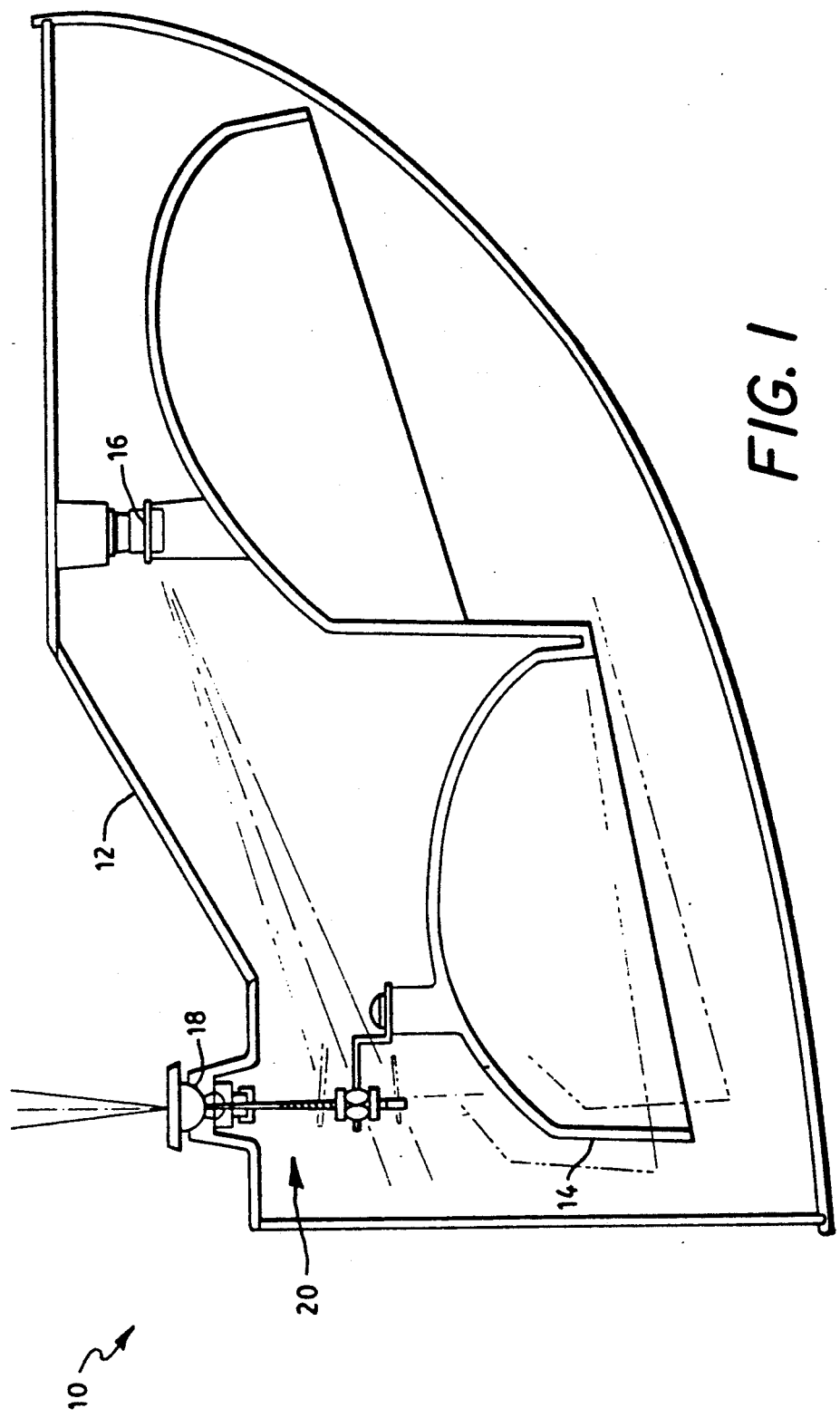
FIG. 1 shows a top schematic view of an example headlamp module with an external housing, an internal reflector and an adjustment linkage.

FIG. 1 shows a top schematic view of an example headlamp module 10 with an external housing 12, an internal reflector 14, and an adjustment linkage. The housing 12 supports one end of the reflector 14 by a pivot point 16. The housing 12 also includes a vertical reference point (not shown) and a horizontal reference point 18 from which an adjustment linkage 20 extends to the support the other end of the reflector 14. By adjusting the length of the adjustment linkage 20, the reflector may be pivoted right and left, thereby aiming the reflector 14 and forward beam. FIG. 1. shows this conceptual arrangement for the horizontal adjustment.

Figure 2:
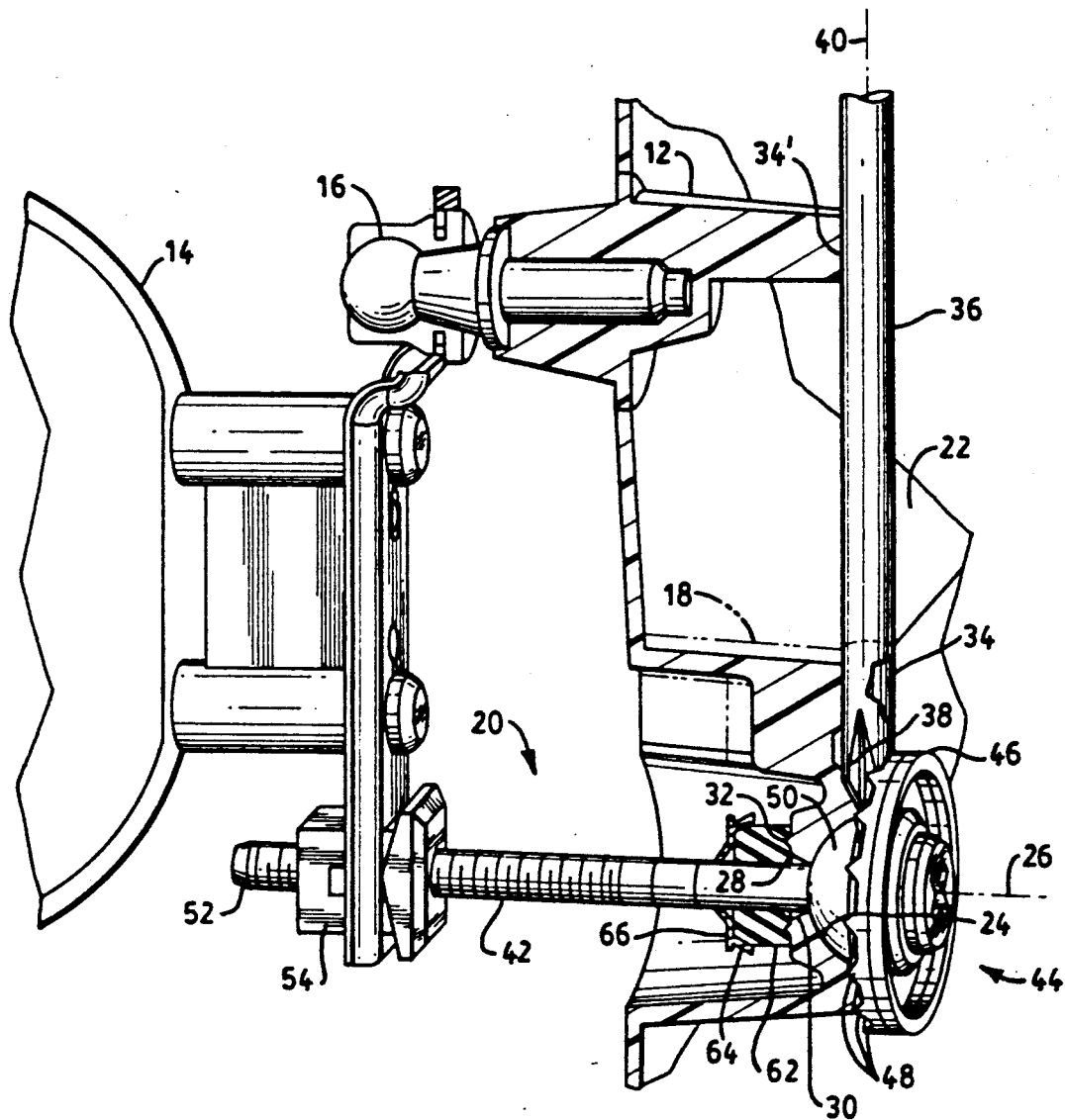
FIG. 2 shows a side of a preferred adjustment linkage, partially in cross section, and partially schematic.

FIG. 2 shows a side view of a preferred vertical adjustment linkage 20, partially in cross section, and partially schematically. The adjustment linkage 20 for vehicle headlamp is assembled from a housing coupler 22, an adjustment shaft 42, rubber grommet 62, a cup 64, a lock washer 66, and a threaded holder 54 for coupling to a pivotable reflector 14. The housing coupler 22 may be made out of metal or plastic, and is conveniently formed as a molded portion of the housing 12. The preferred housing coupler 22 includes a means for supporting a rotatable shaft, and an external wall defining a channel for a rotatable tool. The housing coupler 22 provides a stable reference point from which the adjustment linkage 20 may adjustably extend from.

The preferred means for supporting the shaft 42 is cylindrical through passage defined by a wall portion of the housing coupler 22. In the preferred embodiment, positioned along housing coupler 22 in an exterior end of the shaft passage is a ball socket 24. The shaft passage then extends along a shaft axis 26 through a portion of the housing coupler 22 to an interior end 28. The shaft passage for the portion from the ball socket 24 to the interior end 28 is formed to allow pivoting of the shaft 42, and the preferred embodiment the interior end of the shaft passage is a cone 30, with the wide end of the conic passage facing the reflector 14 with the geometric center of the ball of the ball socket 24 at the geometric peak of the cone 30. In the preferred embodiment, the shaft passage 28 is then angled, or flared open from the base of the ball socket 24, to allow pivoting of a shaft 42 in the shaft passage 28. The preferred housing coupler 22 also includes a means for enhanced sealing to the rubber grommet 62, or similar such seal, such as a rib 32, groove, or similar surface feature that encircles the interior end 28. The preferred housing coupler 22 includes a rib 32 formed around the interior end 28 that a rubber grommet 62 may be coupled to.

The housing coupler 22 may also include a wall defining a tool channel 34 for a rotatable tool 36. The preferred rotatable tool 36 is a standard Philipshead screw driver. The preferred rotatable tool 36 then has a relatively long cylindrical shaft portion with a set of tool teeth 38 evenly distributed about the end of the rotatable tool 36, and facing both toward a forward end of the tool 36 and to the side of the tool 36. The tool channel 34 wall is designed to conform with at least a portion of the surface of rotation of the tool 36. The tool channel 34 wall may then act as a guide and support for the tool 36. For the preferred tool 36, a Philipshead screw driver, the tool channel 34 may then be an axial section of a circular cylinder. The rotatable tool 36 may then be held in position against the housing coupler 22 while being rotated about a tool axis 40 of the rotatable tool 36. The shaft axis 26, and tool axis 40 are aligned to intersect, and preferable aligned to intersect at right angles. The exterior end and the wall defining the tool channel 34 then join near the intersection of the shaft axis 26 and the tool axis 40.

The housing coupler 22 supports the adjustment shaft 42. The adjustment shaft 42 has a geared end 44, a ball portion 46, a central shaft length, and a threaded end 50. In the preferred embodiment the adjustment shaft 42 is made of metal. The geared end 44 includes a plate 46 with one side facing the shaft length. Distributed evenly around the shaft axis 26, along the gear plate 46, on the side facing the shaft length are gear teeth 48. The size and shape of the gear teeth 48 are then chosen to mate with the tool teeth 38. Where the chosen rotatable tool 36 is a Philipshead screw driver, the gear teeth 48 are chosen to mate with the teeth of the Philipshead screw driver. The preferred geared end 44 has about sixteen gear teeth 48 designed to mated with a standard Philipshead (size 2) screw driver. Adjacent the geared end 44 is a section of a sphere, or ball 50 coaxial with the adjustment shaft 42 and having substantially the same diameter as does the ball socket 24, so the ball socket 24 and ball 50 may be mated.

Along the opposite end of the adjustment shaft 42 is a threaded end 52. The threaded end 52 is designed to couple with a threaded coupler 54 positioned on a pivotable vehicle reflector 14. Threaded headlamp couplers are commonly nylon, or similar plastic pieces that fit in a metal bracket. The threaded end 52 then has threading that is appropriate for threading to a plastic piece, and for repeated threaded adjustment therewith. In the preferred embodiment, the geared end 44 is formed as separate cast gear including the plate 46, gear teeth 48 and ball 50. The gear 44 is then press fitted to a threaded shaft to form complete adjustment shaft 42.

Adjacent the interior end 28 of the preferred embodiment, coupled to the circular locating rib 32, and positioned on the adjustment shaft 42 is an elastic or rubber positioning grommet 62 or bushing. The grommet 62 may in turn be held in a cup 64, and lock washer 66 assembly that may also be positioned on the adjustment shaft 42. The rubber grommet 62 is then compressible between the interior end 28 and the cup 64 and washer 66 assembly. If the shaft ball 50 pivots in the ball socket 24, the adjustment shaft 42 pivots, compressing the rubber grommet 62 transverse to the shaft axis 26, while still sealing between the housing coupler 22 and the adjustment shaft 42. If the distance between the tool channel 34 and gear teeth 48 becomes shortened due to the pivoting of the adjustment shaft 42, the grommet 62 may be compressed slightly during tool rotation, thereby providing relief to the tool and gear interaction. The adjustment linkage may then be moved for proper reflector 14 positioning, while the shaft seal provided by grommet 62 prevents water or vapor from leaking into the housing. The friction of the compressed grommet 62 further retains the adjustment shaft 42 in proper position once the adjustment is made.

In a proposed design some of the dimensions were approximately as follows: The housing coupler would be made of a plastic, such as polycarbonate, and have a means for coupling to a vehicle, and a means for supporting a rotatable adjustment shaft. The wall defining a channel for size 2 Philipshead screw driver would be an axial half section of a circular cylinder formed on the rear exterior of the housing. The cylinder diameter would be about 5.0 millimeters, and the wall length would be about 10.0 millimeters. The inside portion of the exterior shaft passage end of the shaft passage would be formed as a section of a sphere having diameter of about 10.0 millimeters. The shaft passage would be about 5.0 millimeters long, and have a narrowest diameter of about 4.0 millimeters. Formed on the exterior of the housing coupler, around the interior shaft passage end of the shaft passage would be a rib about 1.0 millimeters high, and 7 millimeters in diameter. The adjustment shaft would be made of steel. The gear would be formed as a separate piece cast from a zinc alloy with a plate diameter of about 20.0 millimeters. Sixteen teeth would be formed along the perimeter, and radially on one side of the gear. The gear teeth would be about 1.5 millimeters high, and would be designed to rotationally mate with a size 2 Philipshead screw driver. The gear would be press fitted to an adjustment shaft. The shaft would be about 10.0 centimeters long, with threads formed in the end opposite the geared end. The adjustment shaft would be threaded through the shaft passage so the gear teeth were positioned adjacent the tool channel, and the ball portion of the adjustment shaft, mated with the ball socket of the shaft passage. A rubber bushing would then be slid over the threaded end of the adjustment shaft and butted against interior shaft passage end of the shaft passage, mating with the formed rib. A metal cup and clamping washer would then in turn be slid over the adjustment shaft to hold adjustment shaft tightly in the shaft passage with the ball pressed against the socket. The threaded end of the adjustment shaft would then be threaded to a nylon piece held in a bracket coupled to the lighting module.

While there have been shown and described what are at present considered to be the preferred embodiments of the invention, it will be apparent to those skilled in the art that various changes and modifications can be made herein without departing from the scope of the invention defined by the appended claims. In particular, while horizontal scheme is shown in FIG. 1, and a vertical scheme is shown in FIG. 2, it should be apparent that the geared driver linkage may be adapted to both vertical and horizontal adjustments. Also, headlamp modules in general may be coupled to vehicles by appropriate bracketing.

What is claimed is:

1. An adjustment linkage for an enclosed vehicle headlamp reflector comprising:
   a) a housing coupler forming a portion of a reflector housing, including a means for supporting a rotatable shaft,
   b) an adjustment shaft having an interior end with a threaded portion, and an exterior end, the shaft being supported by the housing coupler, and having exterior means for rotating the shaft
   c) a threaded coupler for coupling to a pivotable reflector enclosed in the reflector housing, the threaded coupler being threaded to the threaded portion of the interior end of the adjustment shaft, and
   d) an elastic grommet encircling and coupled to the shaft, and encirclingly coupled to the coupler housing around the means for supporting the rotatable shaft to form a seal between the housing coupler and the shaft.

2. The adjustment linkage in claim 1, wherein means for supporting the rotatable shaft in the housing coupler includes a ball socket, and the adjustment shaft includes a ball portion mated to the ball socket.

3. The adjustment linkage in claim 1, wherein the means for supporting the rotatable shaft in the housing coupler includes a ball socket, and a flared wall extending from the ball socket to an end away from the ball socket thereby defining a shaft passage permitting rotation and pivotation of the shaft positioned in the shaft passage, and the shaft having a ball portion mated to ball socket.

4. The adjustment linkage in claim 3, wherein the shaft passage extending away from the ball socket has a conical form.

5. The adjustment linkage in claim 3, wherein the grommet abuts the housing coupler adjacent the end of shaft passage away from the ball socket, thereby holding the adjustment shaft tightly against the housing coupler while substantially sealing to the housing coupler and the adjustment shaft.

6. The adjustment linkage in claim 1, wherein the grommet is held in a cup shaped piece positioned around the adjustment shaft.

7. The adjustment linkage in claim 6, wherein adjacent the cup, on a side opposite from the grommet, is a means for preventing the cup from motion along the adjustment shaft, away from the grommet.

8. An adjustment linkage for vehicle headlamp comprising:
   a) a housing coupler having a means for coupling to a vehicle, a wall portion defining a tool channel, and a means for supporting a rotatable shaft,
   b) a compressible grommet having a formed passage therethrough, positioned to compressably abut the housing coupler;
   c) an adjustment shaft extending through the formed grommet passage to be engaged with the grommet and supported by the housing coupler, allowing axial translation of the shaft at the grommet toward the housing coupler to compress the grommet against the housing coupler, the shaft further having a geared end including gear teeth, with the gear teeth positioned adjacent the tool channel so as to be engagable from the tool channel, the adjustment shaft further having a threaded end, and
   d) a threaded coupler for coupling to a pivotable vehicle headlamp, the threaded coupler being threaded to the threaded end of the adjustment shaft, whereby a toothed tool may be positioned in the tool channel to engage the gear teeth to rotate the gear and thereby thread the threaded shaft with the threaded coupler.

* * * * *